(12) United States Patent
Tabuki et al.

(10) Patent No.: US 11,375,069 B2
(45) Date of Patent: Jun. 28, 2022

(54) IMAGE PROCESSING APPARATUS FOR EXECUTING A TRANSMISSION JOB, AND METHOD THEREOF

(71) Applicant: CANON KABUSHIKI KAISHA, Tokyo (JP)

(72) Inventors: Masumi Tabuki, Yokohama (JP); Jun Omata, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/509,883

(22) Filed: Jul. 12, 2019

(65) Prior Publication Data

US 2019/0335042 A1   Oct. 31, 2019

Related U.S. Application Data

(63) Continuation of application No. 14/552,960, filed on Nov. 25, 2014, now abandoned.

(30) Foreign Application Priority Data

Dec. 4, 2013  (JP) ................................ 2013-251143
May 23, 2014 (JP) ................................ 2014-107382

(51) Int. Cl.
*H04N 1/00* (2006.01)

(52) U.S. Cl.
CPC ......... *H04N 1/0035* (2013.01); *H04N 1/0048* (2013.01); *H04N 1/00352* (2013.01);
(Continued)

(58) Field of Classification Search
None
See application file for complete search history.

(56) References Cited

U.S. PATENT DOCUMENTS 8,375,391 B2 * 2/2013 Bessho ................... G06F 11/32
358/1.15
8,498,003 B2 * 7/2013 Kirihara ............. H04N 1/32101
358/1.14

(Continued)

FOREIGN PATENT DOCUMENTS

JP   2005153346 A   6/2005
JP   2005217560 A   8/2005
(Continued)

OTHER PUBLICATIONS

Office Action issued in Japanese Application No. 2018-136021 dated Jul. 30, 2019.
(Continued)

*Primary Examiner* — Miya J Williams
*Assistant Examiner* — Pawan Dhingra
(74) *Attorney, Agent, or Firm* — Rossi, Kimms & McDowell LLP

(57) ABSTRACT

An image forming apparatus which can easily identify a user's erroneous operation, a controlling method of the image forming apparatus, and a program for achieving the controlling method are provided. When an operation by a user to an operation unit is accepted, the image forming apparatus obtains operation information including a key code and a screen identifier, and stores, for each job, the obtained operation information in a storing unit.

19 Claims, 13 Drawing Sheets

(52) U.S. Cl.
CPC ..... *H04N 1/00408* (2013.01); *H04N 1/00411* (2013.01); *H04N 1/00437* (2013.01); *H04N 1/00477* (2013.01)

(56) References Cited

U.S. PATENT DOCUMENTS

| | | | | |
|---|---|---|---|---|
| 9,641,720 | B2 | 5/2017 | Nakagawa | |
| 2005/0111866 | A1* | 5/2005 | Sato | G03G 15/502 399/79 |
| 2005/0254070 | A1* | 11/2005 | Sayama | G06F 21/608 358/1.1 |
| 2006/0077417 | A1* | 4/2006 | Nakata | G06F 21/608 358/1.14 |
| 2008/0005700 | A1* | 1/2008 | Morikawa | G06F 3/0482 715/841 |
| 2008/0130044 | A1* | 6/2008 | Yamada | H04N 1/32133 358/1.15 |
| 2008/0144091 | A1* | 6/2008 | Oshima | G06F 3/1285 358/1.15 |
| 2008/0165386 | A1* | 7/2008 | Harada | H04N 1/00973 358/1.16 |
| 2008/0192283 | A1* | 8/2008 | Kobayashi | H04N 1/00432 358/1.15 |
| 2009/0067347 | A1* | 3/2009 | Kimura | H04L 41/0859 370/255 |
| 2010/0070976 | A1* | 3/2010 | Bessho | H04N 1/32122 715/771 |
| 2010/0149575 | A1* | 6/2010 | Ozawa | H04N 1/00472 358/1.15 |
| 2010/0177344 | A1* | 7/2010 | Matsumoto | H04N 1/00344 358/1.15 |
| 2010/0214600 | A1* | 8/2010 | Yagi | H04N 1/4426 358/1.15 |
| 2011/0072494 | A1* | 3/2011 | Sato | G06F 3/0481 715/845 |
| 2011/0096348 | A1* | 4/2011 | Ebi | G03G 15/502 358/1.14 |
| 2012/0182575 | A1* | 7/2012 | Ikeda | H04N 1/00244 358/1.15 |
| 2012/0212763 | A1* | 8/2012 | Honma | G06F 3/1285 358/1.13 |
| 2012/0224206 | A1* | 9/2012 | Takahashi | G06F 3/1221 358/1.13 |
| 2013/0016395 | A1* | 1/2013 | Akutsu | G06F 3/1288 358/1.15 |
| 2013/0063769 | A1* | 3/2013 | Kawabe | G06Q 10/10 358/1.15 |
| 2013/0201529 | A1* | 8/2013 | Morita | H04N 1/32122 358/402 |
| 2014/0022590 | A1* | 1/2014 | Matsuda | H04N 1/00344 358/1.15 |
| 2015/0138598 | A1* | 5/2015 | Yamamichi | H04N 1/32667 358/1.15 |
| 2015/0172485 | A1* | 6/2015 | Ikkanzaka | H04N 1/00474 358/1.13 |

FOREIGN PATENT DOCUMENTS

| | | |
|---|---|---|
| JP | 2005242988 A | 9/2005 |
| JP | 2006093824 A | 4/2006 |
| JP | 2007088531 A | 4/2007 |
| JP | 2008199340 A | 8/2008 |
| JP | 2009110521 A | 5/2009 |
| JP | 2010021734 A | 1/2010 |
| JP | 2010161714 A | 7/2010 |
| JP | 2011114370 A | 6/2011 |

OTHER PUBLICATIONS

Office Action issued in Japanese Appln. No. 2014-107382 dated Jan. 9, 2018. English translation provided.
Office Action issued in U.S. Appl. No. 14/552,960 dated May 22, 2015.
Office Action issued in U.S. Appl. No. 14/552,960 dated Dec. 16, 2015.
Office Action issued in U.S. Appl. No. 14/552,960 dated Jun. 2, 2016.
Office Action issued in U.S. Appl. No. 14/552,960 dated Oct. 11, 2016.
Office Action issued in U.S. Appl. No. 14/552,960 dated Mar. 30, 2017.
Office Action issued in U.S. Appl. No. 14/552,960 dated Nov. 9, 2017.
Office Action issued in U.S. Appl. No. 14/552,960 dated Apr. 5, 2018.

* cited by examiner

FIG. 3

OPERATION HISTORY 3
OPERATION HISTORY 2
OPERATION HISTORY 1

JOB IDENTIFIER

| SCREEN IDENTIFIER | TIME OF DAY | KEY CODE | COORDINATE POSITION |
|---|---|---|---|
| FAX-001 | 10/05/2013 13:00 | START KEY | — |
| FAX-002 | 10/05/2013 12:59 | ↓ | — |
| FAX-004 | 10/05/2013 12:56 | → | — |
| FAX-001 | 10/05/2013 12:55 | 1 | ... |
| ... | ... | ... | ... |

FIG. 4

| SCREEN IDENTIFIER | SOFTKEY ITEM NAME | KEY CODE |
|---|---|---|
| FAX001 | | |
| | RECEPTION MODE | FAX001 |
| | RESOLUTION | 0x00030001 |
| | DENSITY | 0x00030002 |
| | TWO-SIDED ORIGINAL | 0x00030003 |
| | SHARPNESS | 0x00030004 |
| FAX002 (RECEPTION MODE) | | 0x00030005 |
| | | FAX002 |
| | AUTOMATIC RECEPTION | 0x00030011 |
| | FAX/TEL CHANGEOVER | 0x00030012 |
| | MANUAL RECEPTION | 0x00030013 |
| | ANSWERPHONE CONNECTION | 0x00030014 |
| FAX003 (RESOLUTION) | | FAX003 |
| | 200×100 dpi (STANDARD) | 0x00030021 |
| | 200×200 dpi (HIGH DEFINITION) | 0x00030022 |
| | 200×400 dpi (ULTRAHIGH DEFINITION) | 0x00030023 |
| FAX005 (TWO-SIDED ORIGINAL) | | FAX004 |
| | OFF | 0x00030031 |
| | ON (RIGHT-LEFT SPREAD) | 0x00030032 |
| | ON (UP-DOWN SPREAD) | 0x00030033 |

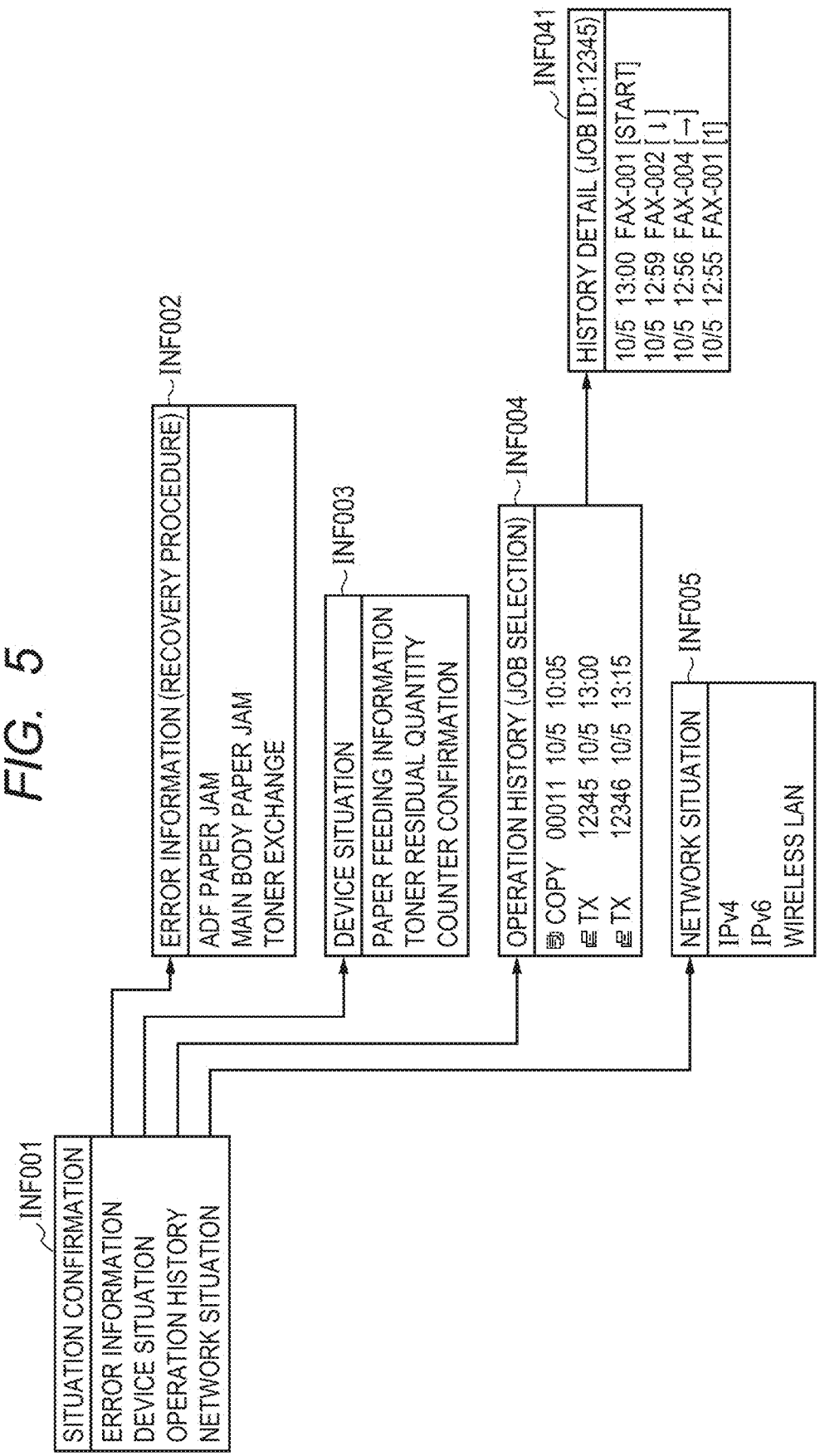

FIG. 13

OPERATION HISTORY

| JOB IDENTIFIER |
|---|
|  |

| SCREEN IDENTIFIER | TIME OF DAY | KEY CODE | COORDINATE POSITION |
|---|---|---|---|
| 504 | 10/05/2013 13:01 | START KEY | — |
| 503 | 10/05/2013 13:00 | OK KEY | — |
| 503 | 10/05/2013 12:59 | → | — |
| 503 | 10/05/2013 12:56 | AUTHENTICATION KEY | — |
| 502 | 10/05/2013 12:55 | — | — |
| 501 | 10/05/2013 12:54 | ADDRESS BOOK KEY | ⋯ |
| ⋯ | ⋯ | ⋯ | ⋯ |

IMAGE PROCESSING APPARATUS FOR EXECUTING A TRANSMISSION JOB, AND METHOD THEREOF

BACKGROUND OF THE INVENTION

Field of the Invention

The present invention relates to an image forming apparatus, a controlling method thereof, and a program for the controlling method.

Description of the Related Art

Conventionally, there is an image forming apparatus which has a function of recording, as operation histories, operations of keys and buttons performed on an operation panel or the like thereof (for example, Japanese Patent Application Laid-Open No. 2005-153346). In such a technique disclosed in Japanese Patent Application Laid-Open No. 2005-153346, the operation history is administrated for each user. Therefore, for example, if one user performs a plurality of jobs, pieces of information corresponding to the plurality of jobs are together stored in the operation history.

Besides, there is proposed a system in which operation histories of keys, buttons and the like are intensively observed or monitored by a server so as to analyze usage situations of equipment (for example, Japanese Patent Application Laid-Open No. 2009-110521).

However, in the technique disclosed in Japanese Patent Application Laid-Open No. 2005-153346, as described above, the pieces of information corresponding to the plurality of jobs are together stored. Thus, to identify a cause of erroneous transmission, it is necessary to first identify the user and further identify the information concerning the corresponding job in the corresponding operation histories.

Therefore, when identifying the erroneous operation of the user by the technique disclosed in Japanese Patent Application Laid-Open No. 2005-153346, it takes time for problem analysis, and thus there is a problem that the apparatus is not user friendly.

Moreover, to identify a cause of erroneous transmission by the technique disclosed in Japanese Patent Application Laid-Open No. 2009-110521, it is necessary to identify the equipment and the job from among large quantities of collected data. Consequently, it takes time for problem analysis, and thus there is a problem that the apparatus is not user friendly.

As just described, in the conventional techniques, there is the problem that the user's erroneous operation cannot easily be identified.

An object of the present invention is to provide an image forming apparatus which can easily identify the user's erroneous operation, a controlling method of the image forming apparatus, and a program for achieving the controlling method.

SUMMARY OF THE INVENTION

To achieve the above object, in the present invention, an image forming apparatus is characterized by comprising: a displaying unit; an operation unit configured to accept an operation by a user; an obtaining unit configured to, in a case where the operation by the user to the operation unit is accepted, obtain operation information which includes an operation identifier indicating a content of the operation by the user and a screen identifier indicating a screen displayed on the displaying unit; and a history information storing unit configured to store, for each job, the operation information obtained by the obtaining unit in a storing unit.

According to the present, in the case where the operation by the user to the operation unit is accepted, the operation information which includes the operation identifier indicating the content of the operation by the user and the screen identifier indicating the screen displayed on the displaying unit is obtained, and the obtained operation information is stored in the storing unit for each job. Consequently, it is possible to identify a user's erroneous operation for each job, so that it is possible to easily identify the user's erroneous operation.

Further features of the present invention will become apparent from the following description of exemplary embodiments with reference to the attached drawings.

BRIEF DESCRIPTION OF THE DRAWINGS

FIG. 3 is a diagram illustrating operation history tables to be stored in the HDD (hard disk drive) of FIG. 1.

FIG. 4 is a diagram illustrating key codes of softkeys to be stored in the HDD of FIG. 1.

FIG. 5 is a diagram illustrating an operation history screen and other screens to be displayed on the displaying section of FIG. 2, and their screen identifiers.

FIG. 13 is a diagram illustrating an operation history table to be stored in the HDD of FIG. 1.

DESCRIPTION OF THE EMBODIMENTS

Hereinafter, embodiments of the present invention will be described with reference to the attached drawings.

First Embodiment

Figure 1:
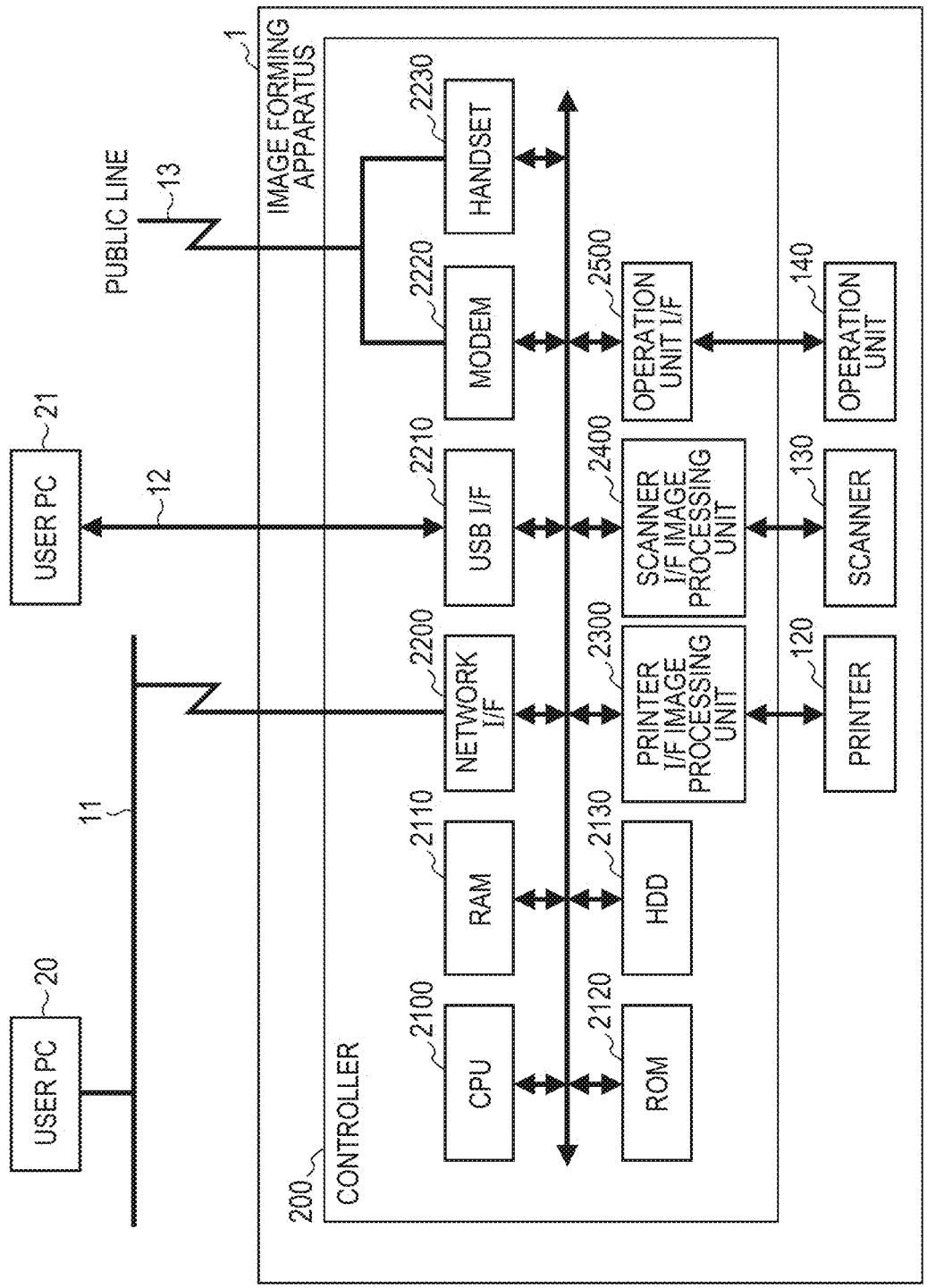
FIG. 1 is a schematic block diagram illustrating an image forming apparatus according to an embodiment of the present invention.

FIG. 1 is a schematic block diagram illustrating an image forming apparatus 1 according to the embodiment of the present invention.

In FIG. 1, the image forming apparatus 1 is composed of a controller 200, a printer 120, a scanner 130 and an operation unit 140.

The controller 200 controls the whole of the image forming apparatus 1. The printer 120 prints an image on a recording medium such as a paper or the like. The scanner 130 reads an original image and outputs image data which indicates the original image. The operation unit 140, which accepts an operation performed by a user, has a display section for displaying various information to the user. The details of this operation unit 140 will be described later.

The controller 200 is composed of a CPU 2100, a RAM (random-access memory) 2110, a network I/F (interface) 2200, a USB I/F (universal serial bus interface) 2210, a modem 2220, a handset 2230, a ROM (read only memory) 2120, an HDD 2130, a printer I/F image processing unit 2300, a scanner I/F image processing unit 2400 and an operation unit I/F 2500.

The CPU 2100 controls the whole of the image forming apparatus 1 by controlling each of parts in the controller 200. The RAM 2110 is used as a work area of the CPU 2100 and stores various programs or various data.

The ROM 2120 stores various programs such as a boot program and the like or various data. A process to be indicated in a flow chart to be described later indicates such a process which is to be performed by the CPU 2100 after that a program stored in the ROM 2120 has been developed in the RAM 2110. The HDD 2130 stores various programs or various data.

The network I/F 2200, which is such an interface operating with a LAN (local area network) 11, is connected with a user PC (personal computer) 20 through the LAN 11.

The USB I/F 2210, which is such an interface operating with a USB device, is connected with a user PC 21 through a USB cable 12.

The modem 2220 is connected with a public line 13, which is used for a fax transmission/reception or the like. The handset 2230, which is also connected with the public line 13, enables a user to perform a voice communication of user.

The printer I/F image processing unit 2300, which is connected with the printer 120, performs the synchronous/asynchronous conversion of image data or performs the image processing for the purpose of performing the print output. The scanner I/F image processing unit 2400, which is connected with the scanner 130, performs the synchronous/asynchronous conversion of the image data or performs the image processing.

The operation unit I/F 2500, which is connected with the operation unit 140, outputs image data to be displayed on the operation unit 140 from the controller 200 and outputs the operation contents performed by a user at the operation unit 140 to the controller 200.

Figure 2:
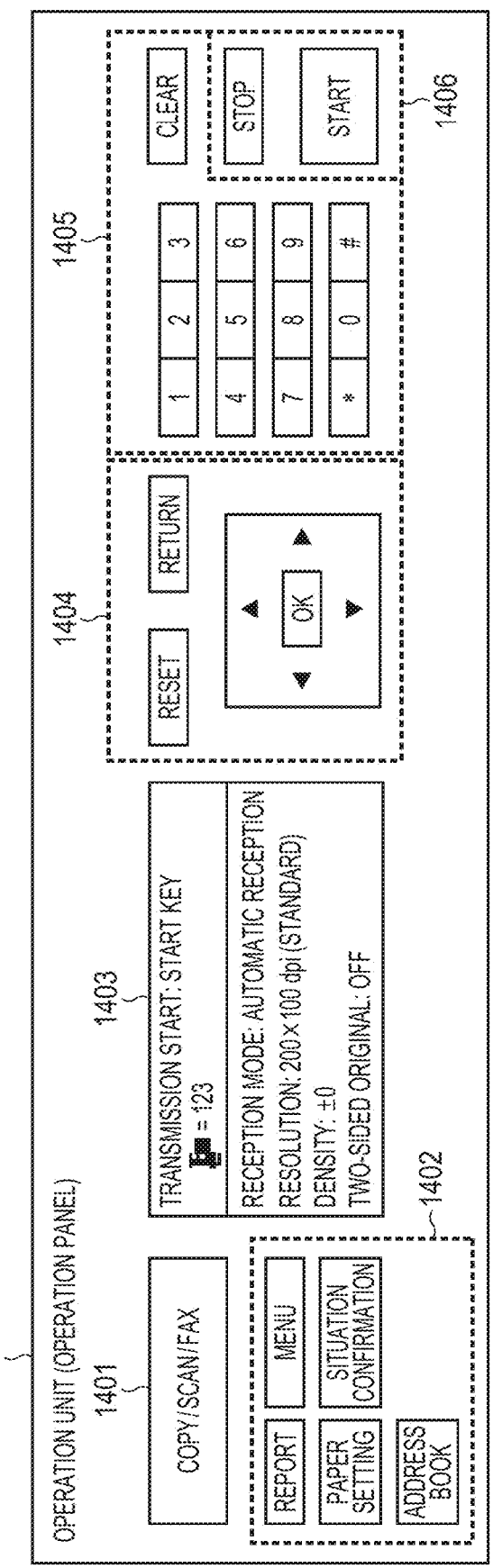
FIG. 2 is a diagram illustrating an outer appearance of the operation unit (operation panel) of FIG. 1.

FIG. 2 is a diagram illustrating an outer appearance of the operation unit 140 indicated in FIG. 1.

In FIG. 2, the operation unit 140 is such an operation panel composed of a function key 1401, a display section 1403, ten keys 1405, and key groups 1402, 1404 and 1406 serving as hard keys.

The function key 1401 is such a key used for selecting functions such as copy, scan and fax.

In the key group 1402, a report key is such a key, which is used for performing a printing instruction of an operation history or performing the job setting related to a paper feeding stage, the two-sided printing or the like to be used when performing the report printing. A menu key is such a key used for performing various settings or the registration for an operation of the image forming apparatus 1 or functions such as copy, scan, fax and the like.

A paper setting key is such a key used for setting the size of papers to be set in a paper feeding cassette or a manual feeding tray. A situation confirmation key is such a key used for performing confirmation of a process performing situation or a stop instruction of process, state confirmation of the image forming apparatus 1, and operating and confirming the operation history or the like. An address book key is such a key used for displaying a list of destination numbers on the display section 1403, and a user can input a destination number by only selecting the displayed destination number.

The display section 1403 displays a state of the image forming apparatus 1 or a process operating situation. In addition, the display section 1403 displays setting items in order to confirm the contents operated by a user and displays characters, numerals or the like according to the operated keys when the user performs the setting to the image forming apparatus 1. Further, a touch panel is provided on the display section 1403, which has a function of serving as softkeys, that is, keys are displayed on the display section 1403.

The key group 1404 is such a key group used for controlling operations concerned with various settings or registrations. A reset key is such a key used for returning the setting to an initial value. A return key is such a key used for returning a screen to a most-recent-state screen. Respective arrow keys of up and down, left and right are such keys used for moving a cursor or performing a selecting operation of the setting items. An OK key is such a key used for determining the set and registered contents.

The ten keys 1405 are such keys used for inputting characters, numerals or the like. A clear key is such a key used for deleting the characters, numerals or the like which were input.

The key group 1406 is such a key group used for controlling the job. A stop key is such a key used for stopping a process. A start key is such a key used for starting the performing of processes such as copy, scan, fax and the like.

FIG. 3 is a diagram illustrating operation history tables to be stored in the HDD 2130 indicated in FIG. 1.

In FIG. 3, an operation history, which is operation information, is constituted by a job identifier, a screen identifier, a time of day, a key code and a coordinate position of the touch panel. In the present embodiment, the job means a series of processes, and copy, scan and fax are previously determined as the job. Therefore, the job in the present embodiment indicates a series of processes concerned with each of the copy, scan and fax. For example, if it is a copy job, the job is a series of processes of reading an original, performing the image processing and the printing.

The job identifier is such an identifier used for identifying the job. The screen identifier is such an identifier which is set for each of screens to be displayed on the display section 1403. The screen identifier in the operation history indicates a screen being displayed on the display section 1403 when an operation performed by a user has been accepted.

The time of day indicates such a time when an operation performed by the user has been accepted. The coordinate position indicates a coordinate position of a touch panel which was touched.

For example, in a case that a fax job has been performed, an identifier indicating the fax job is stored in the job identifier, and a displayed screen, an operated time of day, a key and a touched coordinate position in that fax job are stored on one operation history table.

In this manner, in the present embodiment, the operation history serving as operation information is stored in the HDD 2130 serving as a storing unit for each job.

The above-mentioned key code, which serves as an operation identifier indicating the contents of an operation performed by the user, is such a key code used for specifying keys provided at the operation unit 140. As for respective key codes indicated in FIG. 3, although such key codes which correspond to hard keys are indicated, softkeys are also used in the present embodiment as mentioned above.

FIG. 4 is a diagram illustrating a key table indicating key codes of softkeys to be stored in the HDD 2130 in FIG. 1.

In FIG. 4, the key table is constituted by the screen identifiers, softkey item names to be displayed at that screen and the corresponding key codes.

For example, in a screen where the screen identifier is FAX001, softkeys such as a reception mode, resolution and the like are displayed, and a key code corresponding to the reception mode among the softkeys is 0x00030001.

Therefore, when a user touches the reception mode in the screen where the screen identifier is FAX001, the code 0x00030001 is to be stored in the key code of the operation history table. A touched coordinate position is also included in the operation information, and these information is to be stored on the operation history table.

FIG. 5 is a diagram illustrating an operation history screen and other screens to be displayed on the display section 1403 in FIG. 2, and their screen identifiers.

In FIG. 5, it is indicated that a screen identifier of a situation confirmation screen, which is displayed when the situation confirmation key in the key group 1402 is depressed, is INF001.

In this situation confirmation screen, when "error information" is touched, an error information screen of which a screen identifier is INF002 is displayed.

In the situation confirmation screen, when "device situation" is touched, a device situation screen of which a screen identifier is INF003 is displayed.

In the situation confirmation screen, when "operation history" is touched, an operation history screen of which a screen identifier is INF004 is displayed. In this operation history screen, when "information" indicating one job is further touched, a history detail screen of which a screen identifier is INF041 is displayed.

In the history detail screen, operation contents are sequentially displayed with a state where the last operation performed to a selected job is arranged at a head position. In a case of FIG. 5, it is indicated on the first line that a start key was depressed in a screen of which a screen identifier is FAX-001 at 13:00 on October 5.

On the next line, it is indicated that a downward arrow key was depressed in a screen of which a screen identifier is FAX-002 at 12:59 on October 5. It is allowed that the above operation history information can be printed.

In this manner, although the operation information is output at the display section 1403, it is also possible to output to the printer 120 in order to perform the printing as mentioned above or output to an external device through the USB I/F 2210. Even if an outputting method is any method, a user can confirm the history.

After returning to the situation confirmation screen, when "network situation" is touched in the situation confirmation screen, a network situation screen of which a screen identifier is INF005 is displayed.

Figure 6:
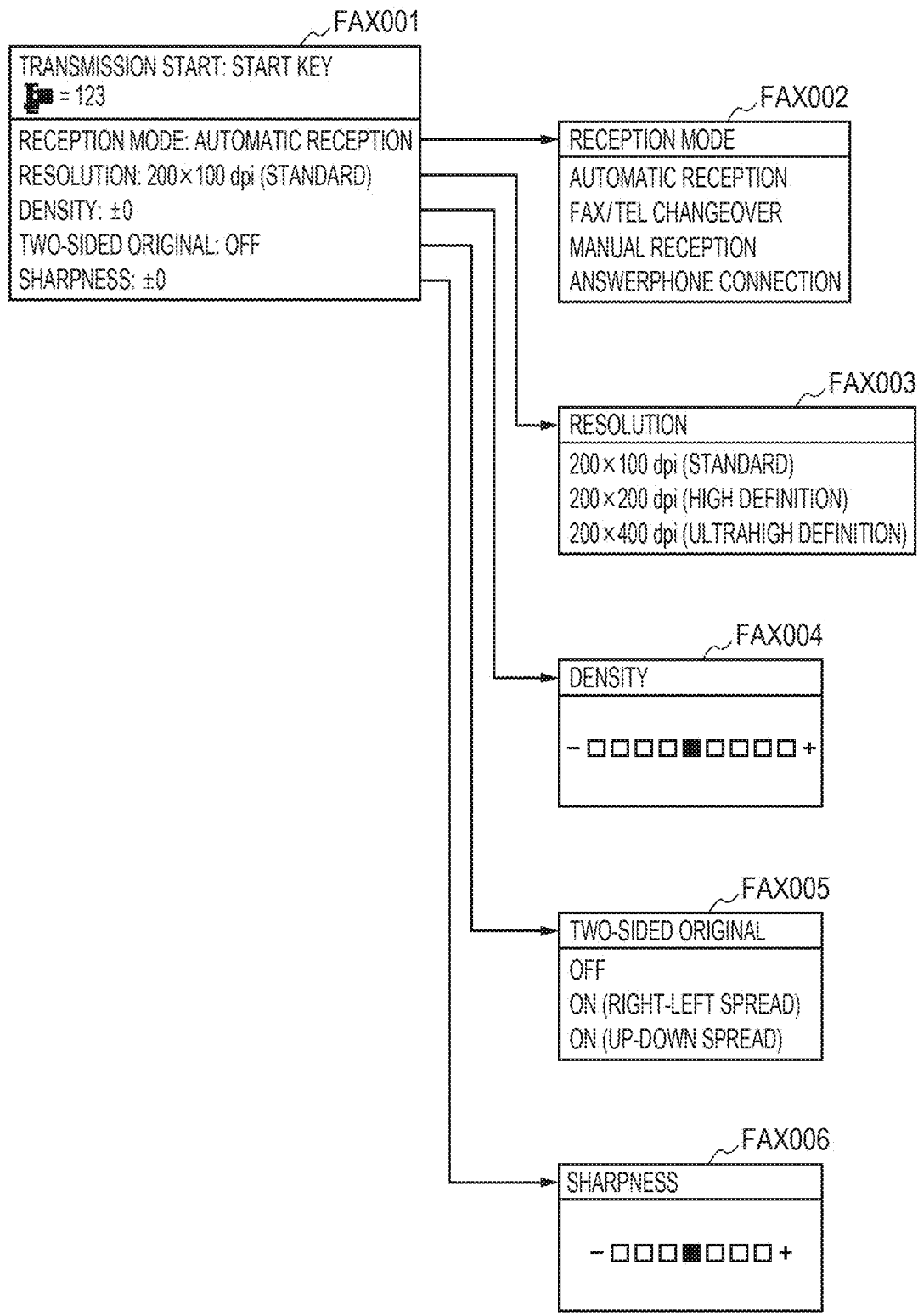
FIG. 6 is a diagram illustrating a fax transmission setting screen and other screens to be displayed on the displaying section of FIG. 2, and their screen identifiers.

FIG. 6 is a diagram illustrating a fax transmission setting screen and other screens to be displayed on the display section 1403 in FIG. 2, and their screen identifiers.

In FIG. 6, it is indicated that a screen identifier of the fax transmission setting screen to be displayed when the fax is selected by the function key 1401 is FAX001.

In this fax transmission setting screen, when "reception mode" is touched, a reception mode screen of which a screen identifier is FAX002 is displayed.

In the fax transmission setting screen, when "resolution" is touched, a resolution screen of which a screen identifier is FAX003 is displayed.

In the fax transmission setting screen, when "density" is touched, a density screen of which a screen identifier is FAX004 is displayed.

In the fax transmission setting screen, when "two-sided original" is touched, a two-sided original screen of which a screen identifier is FAX005 is displayed.

In the fax transmission setting screen, when "sharpness" is touched, a sharpness screen of which a screen identifier is FAX006 is displayed.

The operation identifier indicating the operation described in FIG. 6 is stored in the operation history. For example, in the fax transmission setting screen, when the "reception mode" is touched, the identifier FAX001 which is the screen identifier of the fax transmission setting screen, a touched time of day, the code 0x00030001, which is a key code of the reception mode, serving as softkey and a touched coordinate position are stored on the operation history table. Note that anything is not stored in the job identifier of the operation history table.

Figure 7:
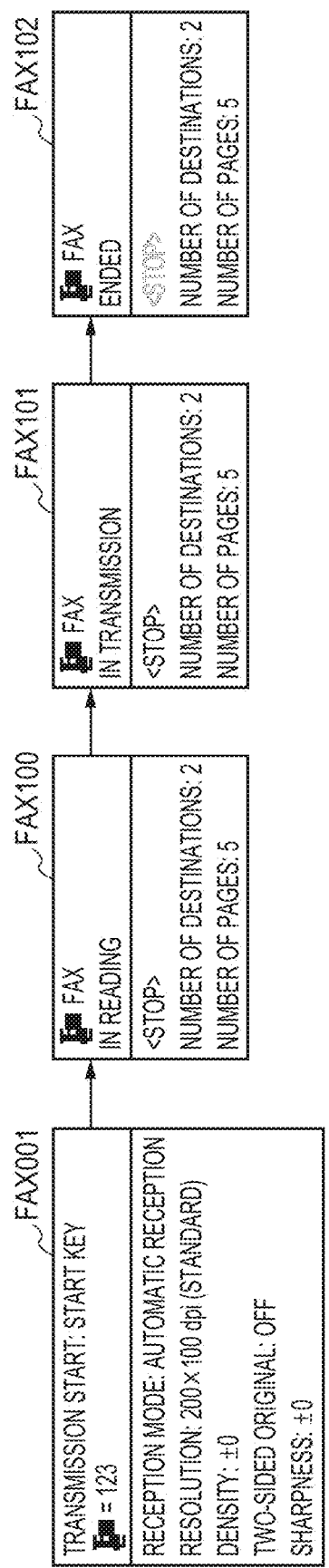
FIG. 7 is a diagram illustrating an example of screens displayed when a job is performed.

FIG. 7 is a diagram illustrating an example of screens displayed when the job is performed.

As for screens illustrated in FIG. 7, the screens in a fax job are used as an example, and the fax job is started by depressing a start key included in the key group 1406 after selecting fax by the function key 1401.

In the fax transmission setting screen of which the screen identifier is FAX001, when the start key is depressed, an "in-reading" screen, of which a screen identifier is FAX100, is displayed. When the transmission is started after completing the reading, an "in-transmission" screen, of which a screen identifier is FAX101, is displayed. Then, when the transmission is completed, an end screen, of which a screen identifier is FAX102, is displayed.

In the above-mentioned fax transmission setting screen, when the start key is depressed, a job identifier of the concerned job is stored on the operation history table. Then, the identifier FAX001 which is the screen identifier of the fax transmission setting screen, a depressed time of day and a key code of the start key are stored on the operation history table, on which the job identifier was stored.

Further, in the "in-reading" screen and the "in-transmission" screen, a user can stop the job by touching <stop> which is being displayed. In a case that the job is stopped by an operation that the <stop> being displayed in the "in-reading" screen or the "in-transmission" screen is touched by the user, the screen identifier FAX100 or FAX101, a key code of <stop>, which is a softkey, and a touched coordinate position are stored on the operation history table.

Note that since this stop operation is performed in the course of the job, a history indicating this stop operation is additionally written as a new record of an operation history table created when the start key was depressed.

Processes related to the above-described operations and histories will be described with reference to a flow chart.

Figure 8:
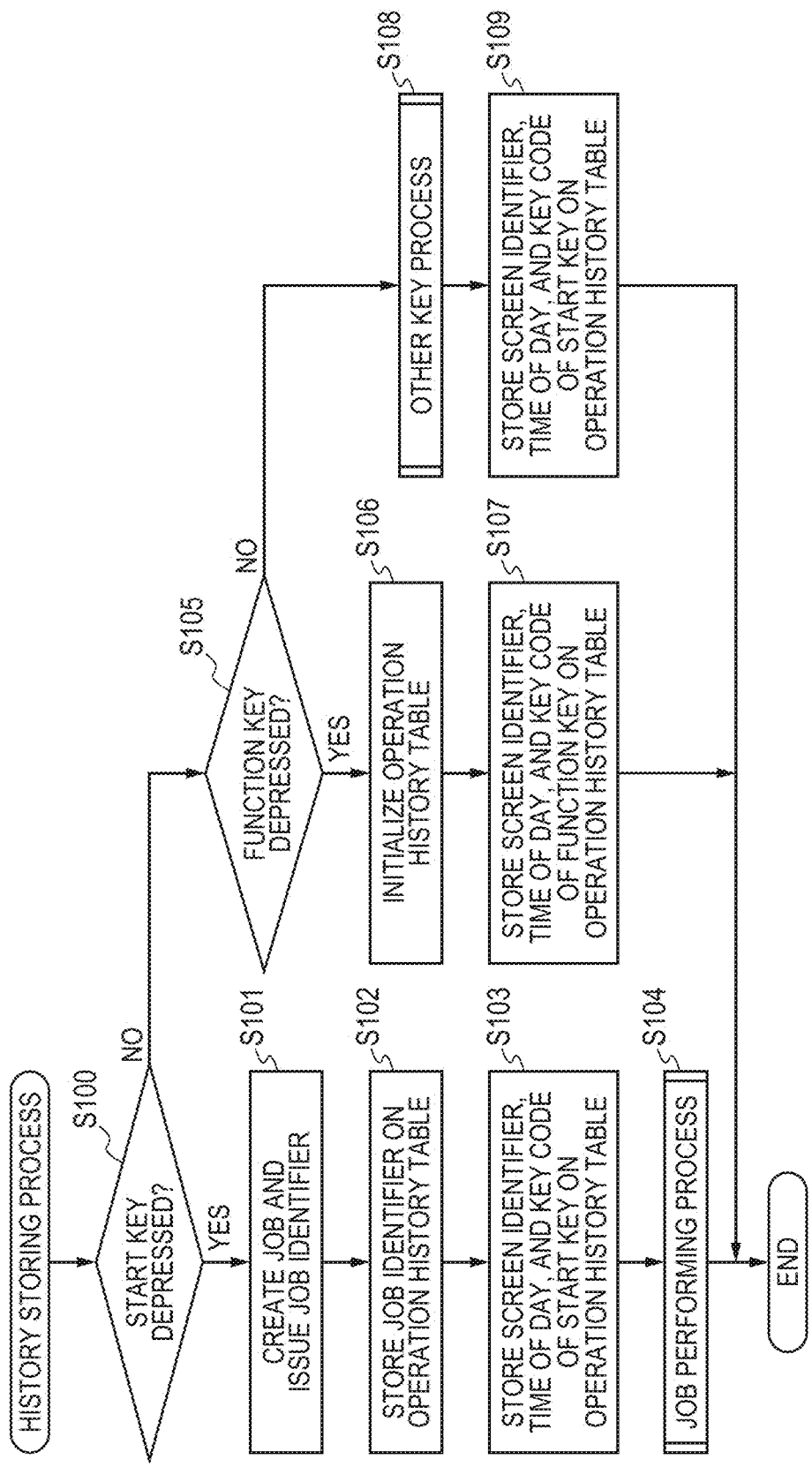
FIG. 8 is a flow chart indicating a procedure of a history storing process to be performed by the CPU (central processing unit) of FIG. 1.

FIG. 8 is a flow chart indicating a procedure of a history storing process to be performed by the CPU 2100 illustrated in FIG. 1. An operation history process in FIG. 8 is such a process, which is started from a state that any job is performed by depressing the start key, like a case of the fax transmission setting screen, for example, described in FIG. 7.

In FIG. 8, it is discriminated whether or not the start key is depressed (step S100). As a result of the discrimination in step S100, when the start key was depressed (YES in step S100), a job corresponding to the screen identifier, which is being displayed on the display section 1403, is created and a job identifier used for identifying the concerned job is issued (step S101). Next, the issued job identifier is stored on the operation history table (step S102).

Next, a screen identifier of the present screen, the depressed time of day and a key code of the start key are obtained, and the above obtained information is stored on the operation history table on which the job identifier is stored (step S103). At this time, a new operation history table is also created. This new operation history table is such a table which is previously prepared in order to store a next operation history. As mentioned above, in the present embodiment, it is premised that the new operation history table is previously prepared. As for an operation history concerned with a job, of course, it is stored on the operation history table on which the job identifier of that job is stored. The above-mentioned step S103 corresponds to an obtaining unit and a history information storing unit.

Then, a job performing process for performing the job is performed (step S104), and the present process is terminated.

It is returned to the process in step S100, and when the start key was not depressed (NO in step S100) as a result of the discrimination in step S100, it is discriminated whether or not a function key was depressed (step S105).

As a result of the discrimination in step S105, when the function key was depressed (YES in step S105), the previously prepared operation history table is initialized (step S106).

Then, a screen identifier of a screen which was displayed when the function key was depressed, a depressed time of day and a key code of the function key are stored on the above-mentioned operation history table (step S107), and the present process is terminated.

On the other hand, as a result of the discrimination in step S105, when the function key was not depressed (NO in step S105), the other key process which is such a process of corresponding to other key is performed (step S108).

Then, a screen identifier of a screen which was displayed when the other key was depressed, a depressed time of day and a key code of the other key are stored on the operation history table (step S109), and the present process is terminated.

In the above-mentioned history storing process, although the operation history is associated with the job by the start key, an operation for starting the job and an operation in the course of performing the job are to be stored in the associated one operation history table.

Figure 9:
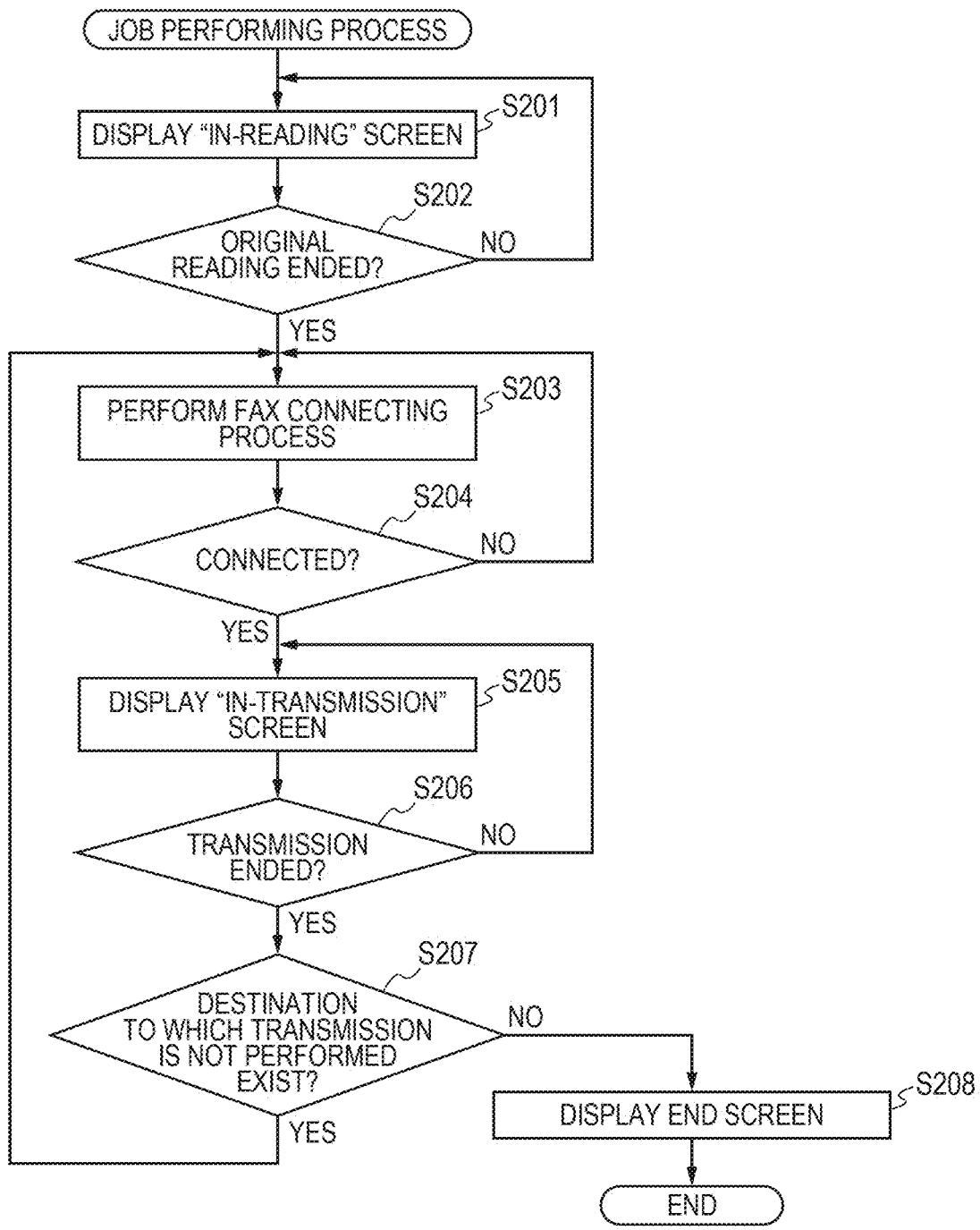
FIG. 9 is a flow chart indicating a procedure of a job performing process in step S104 of FIG. 8.

FIG. 9 is a flow chart indicating a procedure of the job performing process in step S104 indicated in FIG. 8. Incidentally, the flow chart indicated in FIG. 9 exemplifies a fax job.

In FIG. 9, the "in-reading" screen described in FIG. 7 is displayed (step S201), and when the reading of an original is terminated (YES in step S202), a fax connecting process is performed (step S203).

When the fax is connected (YES in step S204), the "in-transmission screen" described in FIG. 7 is displayed (step S205), and when the transmission is terminated (YES in step S206), it is discriminated whether or not a destination, to which the transmission is not performed, exists (step S207).

As a result of the discrimination in step S207, when the destination, to which the transmission is not performed, exists (YES in step S207), a flow returns to step S203.

On the other hand, as a result of the discrimination in step S207, when the destination, to which the transmission is not performed, does not exist (NO in step S207), the end screen described in FIG. 7 is displayed (step S208), and the present process is terminated.

As mentioned above, since it is possible to stop the job in the "in-reading screen and the "in-transmission" screen, when the job was stopped by an operation that the <stop> is touched in the course of performing the above-mentioned job process, a screen identifier, a key code and a coordinate position are stored on the operation history table.

Figure 10:
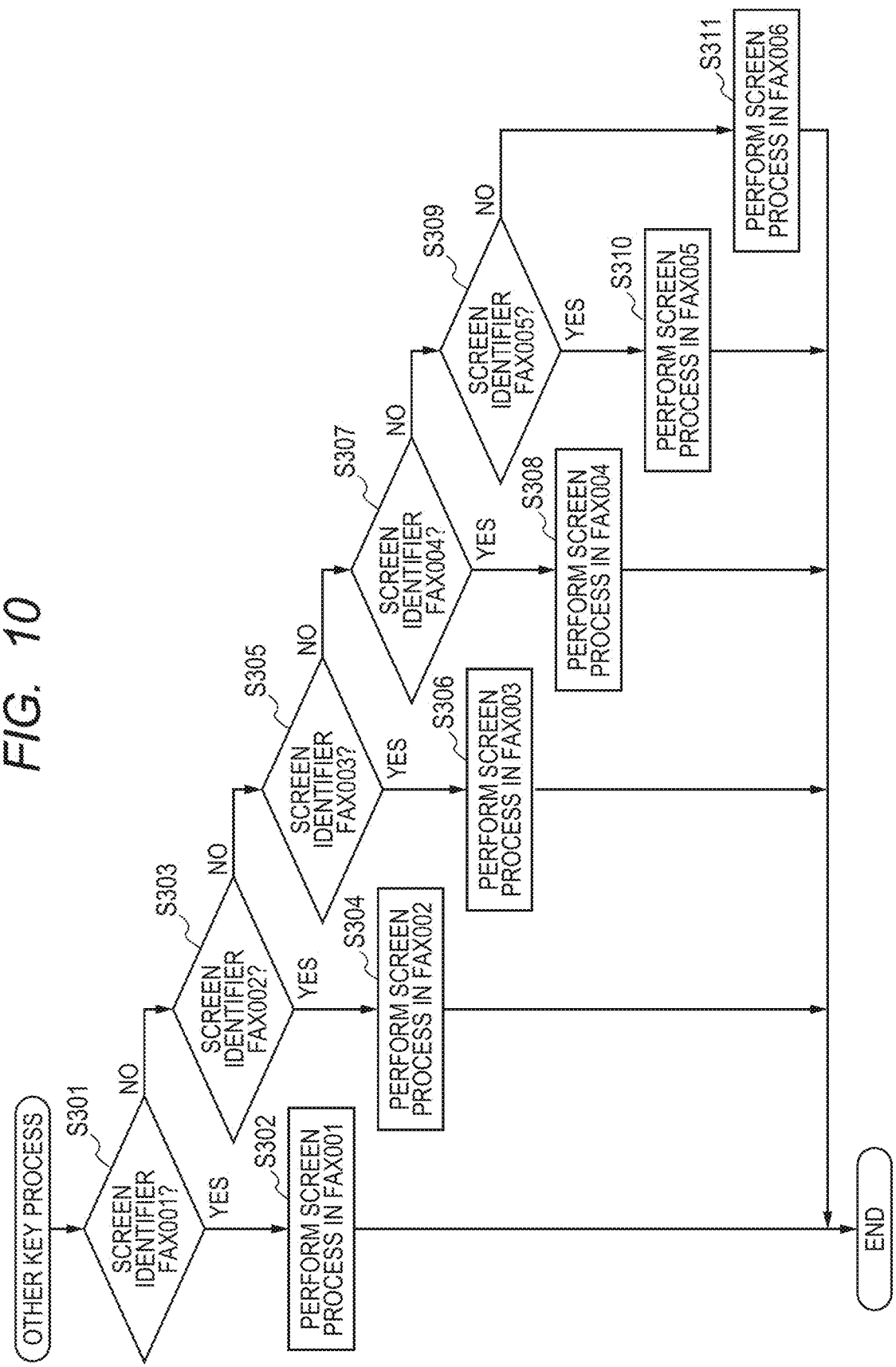
FIG. 10 is a flow chart indicating a procedure of other key process in step S108 of FIG. 8.

FIG. 10 is a flow chart indicating a procedure of the other key process in step S108 indicated in FIG. 8.

In FIG. 10, it is discriminated whether or not a screen identifier of a screen which is currently displayed on the display section 1403 is the FAX001 which is the identifier of the fax transmission setting screen described in FIG. 6 (step S301). As a result of the discrimination in step S301, when the screen identifier is the FAX001 (YES in step S301), a screen process under a state that the screen identifier is the FAX001 is performed (step S302), and the present process is terminated.

On the other hand, as a result of the discrimination in step S301, when the screen identifier is not the FAX001 (NO in step S301), it is discriminated whether or not a screen identifier of the screen which is currently displayed on the display section 1403 is the FAX002 which is the identifier of the reception mode screen described in FIG. 6 (step S303).

As a result of the discrimination in step S303, when the screen identifier is the FAX002 (YES in step S303), a screen process under a state that the screen identifier is the FAX002 is performed (step S304), and the present process is terminated.

On the other hand, as a result of the discrimination in step S303, when the screen identifier is not the FAX002 (NO in step S303), it is discriminated whether or not a screen identifier of the screen which is currently displayed on the display section 1403 is the FAX003 which is the identifier of the resolution screen described in FIG. 6 (step S305).

As a result of the discrimination in step S305, when the screen identifier is the FAX003 (YES in step S305), a screen process under a state that the screen identifier is the FAX003 is performed (step S306), and the present process is terminated.

On the other hand, as a result of the discrimination in step S305, when the screen identifier is not the FAX003 (NO in step S305), it is discriminated whether or not a screen identifier of the screen which is currently displayed on the display section 1403 is the FAX004 which is the identifier of the density screen described in FIG. 6 (step S307).

As a result of the discrimination in step S307, when the screen identifier is the FAX004 (YES in step S307), a screen process under a state that the screen identifier is the FAX004 is performed (step S308), and the present process is terminated.

On the other hand, as a result of the discrimination in step S307, when the screen identifier is not the FAX004 (NO in step S307), a flow advances to step S309.

Subsequently, it is discriminated whether or not a screen identifier of the screen which is currently displayed on the display section 1403 is the FAX005 which is the identifier of the two-sided original screen described in FIG. 6 (step S309). As a result of the discrimination in step S309, when the screen identifier is the FAX005 (YES in step S309), a screen process under a state that the screen identifier is the FAX005 is performed (step S310), and the present process is terminated.

On the other hand, as a result of the discrimination in step S309, when the screen identifier is not the FAX005 (NO in step S309), a screen process under a state that the screen identifier is the FAX006, which is the identifier of the sharpness screen described in FIG. 6, is performed (step S311), and the present process is terminated.

In each of screen processes in steps S302, S304, S306, S308, S310 and S311 in the above-mentioned processes, a screen identifier, a time of day, a key code and a touched coordinate position, in case of performing a touch, are stored on the operation history table as mentioned above.

In this manner, the job and the operation history can be stored by associating with each other and the operation history can be referred every job. Specifically, in the analysis of the erroneous fax transmission or the like, the history of an operation performed to the concerned job can be browsed by only identifying an erroneously transmitted job.

Therefore, it become easy to distinguish if the erroneous transmission is caused by an operation mistake of a user or an erroneous operation of a device, and the time required to analyze a problem can be shortened.

As described above, according to the present embodiment, when an operation performed to the operation unit 140 by a user is accepted, operation information including a key code and a screen identifier is obtained, and the obtained operation information is stored in a storing unit for each job (step S103).

In this manner, in the present embodiment, since an operation of a user can be identified for each job by storing an erroneous operation of a user for each job, the erroneous operation of the user can be easily identified.

Second Embodiment

In the present embodiment, an embodiment in a case that user information, which includes at least one of information capable of identifying an ID (identification), a password and a personal identification number of a user and the user, is input will be described. Note that the constitution of an image forming apparatus 1 and the constitution of an operation unit 140 in the present embodiment are the same as those of the first embodiment. The above-mentioned information capable of identifying the user is personal information, for example, such as a name, sexuality, date of birth or the like.

As described in FIG. 2, the address book key is provided in the key group 1402 of the operation unit 140. When a user depressed this address book key, if the password restriction is placed on the address book, the user is to input a personal identification number.

Figure 11:
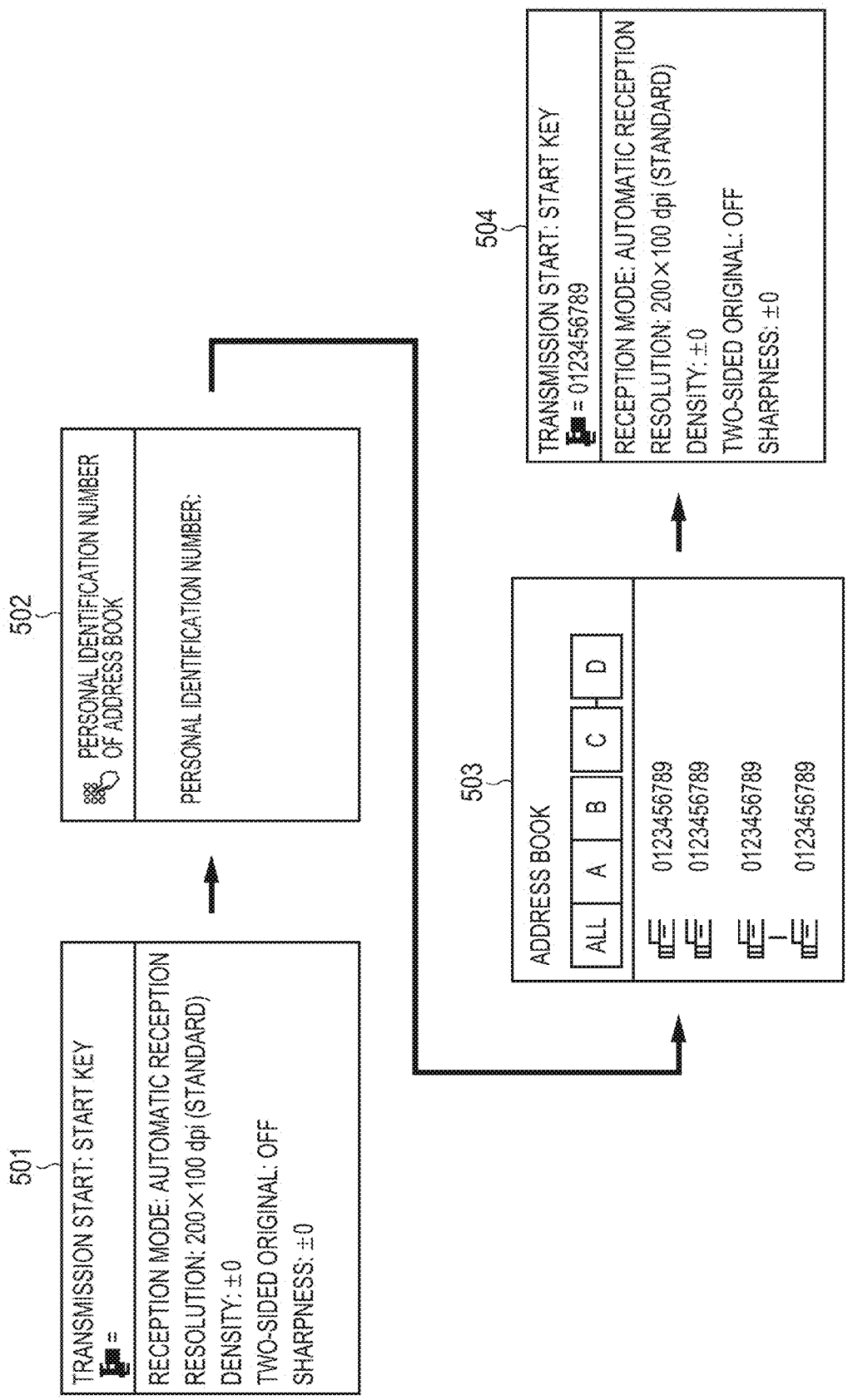
FIG. 11 is a diagram illustrating a password inputting screen and its transition.

FIG. 11 is a diagram illustrating a personal identification number inputting screen and its transition.

In FIG. 11, first, when the user depresses the address book key under a state that a fax screen 501 is displayed on the display section 1403, a personal identification number inputting screen 502 is displayed. When the user inputs a correct personal identification number in this personal identification number inputting screen 502, an address book screen 503 is displayed. When the user selects a destination by operating an arrow key in the address book screen 503, a fax screen 504, in which the selected destination number is displayed, is displayed.

In this manner, when the user information is required from the image forming apparatus 1, the user inputs the user information by using ten keys or the like. At this time, if the image forming apparatus 1 stores an operation history, the user information is to be included in that operation history.

Since the operation history stored on the operation history table in this manner may be sometimes transferred to an external device, there is the possibility that the user information flows out to an external. Therefore, the image forming apparatus 1 according to the present embodiment acts not to store the user information on the operation history table.

Figure 12:
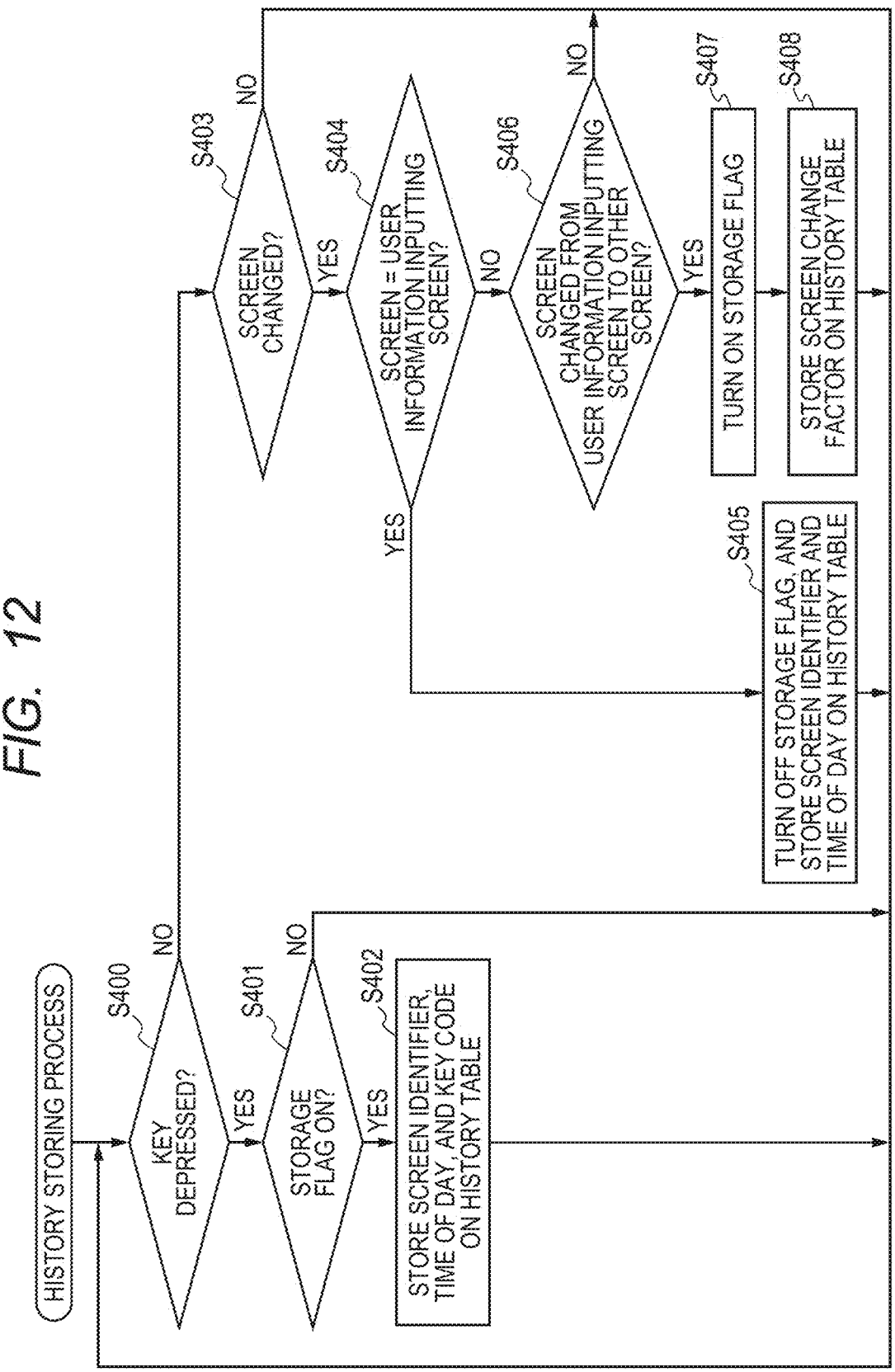
FIG. 12 is a flow chart indicating a procedure of the history storing process to be performed by the CPU of FIG. 1.

FIG. 12 is a flow chart indicating a procedure of the history storing process to be performed by the CPU 2100 indicated in FIG. 1.

In FIG. 12, it is discriminated whether or not any key provided at the operation unit 140 indicated in FIG. is depressed (step S400). As a result of the discrimination in step S400, when the key was depressed (YES in step S400), it is discriminated whether or not a storage flag, which indicates whether or not a key code is stored on the history table, is in an ON-state (step S401).

In a case that the key code is stored on the history table, this storage flag indicates an ON-state, and in a case that the key code is not stored on the history table, the storage flag indicates an OFF-state. In a case of a default state, this storage flag indicates an ON-state.

As a result of the discrimination in step S401, when the storage flag is in an ON-state (YES in step S401), a screen identifier, a time of day and a key code are stored on the history table (step S402), and a flow returns to step S400.

On the other hand, as a result of the discrimination in step S410, when the storage flag is in an OFF-state (NO in step S401), the flow returns to step S400 without storing the key code on the history table.

After returning to step S400, as a result of the discrimination in step S400, when the key is not depressed (NO in step S400), it is discriminated whether or not a screen to be displayed by the display section 1403 is changed (step S403).

As a result of the discrimination in step S403, when the screen is not changed (NO in step S403), the flow returns to step S400. On the other hand, as a result of the discrimination in step S403, when the screen was changed (YES in step S403), it is discriminated whether or not the screen is a user information inputting screen such as the personal identification number inputting screen 502 used for inputting user information (step S404). This user information inputting screen corresponds to a previously determined screen. As this user information inputting screen, a screen used for inputting an ID, a screen used for inputting a password, a screen used for inputting information, which can identify the user, and the like are enumerated other than the above-mentioned personal identification number inputting screen 502.

As a result of the discrimination in step S404, when the screen is the user information inputting screen (YES in step S404), the storage flag is switched to an OFF-state, and a screen identifier and a time of day are stored on the history table (step S405), and the flow returns to the above-mentioned step S400. Consequently, the user information becomes not to be stored on the history table.

On the other hand, as a result of the discrimination in step S404, when the screen is not the user information inputting screen (NO in step S404), it is discriminated whether or not the screen was changed from the user information inputting screen to another screen (step S406). This step S406 is such a process of judging whether or not the screen was changed from, for example, the personal identification number inputting screen 502 to the fax screen 504.

As a result of the discrimination in step S406, when the screen is not changed from the user information inputting screen to another screen (NO in step S406), the flow returns to the above-mentioned step S400.

On the other hand, as a result of the discrimination in step S406, when the screen was changed from the user information inputting screen to another screen (YES in step S406), a screen change factor is stored on the history table (step S408), and the flow returns to the above-mentioned step S400.

The above-mentioned screen change factor is such a factor, by which the screen was changed from the user information inputting screen to another screen. A reason of storing this screen change factor is that there is possibility of becoming not to be able to identify an erroneous operation in a case that a screen changed factor is not understood because the key code is not stored on the history table during the storage flag is in an OFF-state.

The screen change factors are exemplified and enumerated. First, when the screen was changed to the fax screen 504 by an operation that the user input a correct personal identification number at the personal identification number inputting screen 502, an "authentication OK" becomes a screen change factor. On the other hand, when another screen was displayed by an operation that the user input a wrong personal identification number at the personal identification number inputting screen 502, an "authentication NG" becomes a screen change factor.

Further, when the screen was changed from the personal identification number inputting screen 502 to the fax screen 501 by an operation that the user depressed a return key, the depression of the return key becomes a screen change factor.

In this manner, according to the present embodiment, an erroneous operation can be more correctly identified by storing the screen change factor.

FIG. 13 is a diagram illustrating an operation history table to be stored in the HDD 2130 indicated in FIG. 1.

The operation history table in FIG. 13 indicates such a table exemplifying the screen transition indicated in FIG. 11. In order to simplify the description, screen identifiers are assumed to be reference numerals of the respective screens in FIG. 11.

As described in FIG. 11, first, when the user depresses the address book key under a state that the fax screen 501 is displayed on the display section 1403, a reference numeral 501 indicating the screen identifier, information of "2013/10/05 12:54" indicating the time of day and the address book key indicating a key code are stored on the history table.

Next, the personal identification number inputting screen 502 is displayed. Since the personal identification number inputting screen 502 is a user information inputting screen, the storage flag becomes to be in an OFF-state. Therefore, only a reference numeral 502 indicating the screen identifier and information of "2013/10/05 12:55" indicating the time of day are stored on the history table, and user information such as a key code or the like is not stored on the history table.

In this personal identification number inputting screen 502, when the user inputs a correct personal identification number, the address book screen 503 is displayed. A fact that the screen was changed from the personal identification number inputting screen 502 to the address book screen 503 satisfies a condition to be affirmatively discriminated in step S406. Therefore, the storage flag becomes to be in an ON-state, and further, the "authentication OK" is to be stored on the history table as the screen change factor.

Next, when a user selects a destination by operating a downward arrow key only one time in the address book screen 503, an arrow key as a key code is stored on the history table as indicated in FIG. 13.

Then, the destination is fixed by an operation that the user depresses an OK key. At this time, a reference numeral 503 indicating the screen identifier, information of "2013/10/05 13:00" indicating the time of day and the OK key indicating a key code are stored on the history table.

When the OK key is depressed, the fax screen 504 is displayed, and the user depresses a start key. At this time, a reference numeral 504 indicating the screen identifier, information of "2013/10/05 13:01" indicating the time of day and the start key indicating a key code are stored on the history table.

As mentioned above, in the present embodiment, since the user information input by the user in the personal identification number inputting screen 502 is not stored on the history table, the outflow of user information can be prevented.

In the history table indicated in FIG. 13, although a screen change factor is stored in a field of the key code, a field of the screen change factor may be newly provided. In addition, the history table may be stored in the ROM 2120 instead of the HDD 2130.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251143, filed Dec. 4, 2013 and Japanese Patent Application No. 2014-107382, filed May 23, 2014 which are hereby incorporated by reference herein in their entirety.

What is claimed is:

1. An image processing apparatus comprising:
a reading device configured to obtain image data by reading an original;
a communication interface configured to communicate with an external device, the communication interface being used for executing a transmission job of transmitting the image data obtained by the reading device;
an input device configured to accept an input operation of a user; and
at least one controller configured to function as:
a unit configured output one or more setting screens corresponding to a transmission function;
a unit configured to accept a designation of a key corresponding to at least one of the one or more setting screens via the input device, and add identification information of the designated key to an operation history in response to the accepting the designation;
a unit configured to accept an instruction for starting a transmission job;
a unit configured to, in accordance with acceptance of the instruction, perform the transmission job and issue a job ID of the transmission job; and
a unit configured to, after accepting the instruction for starting a transmission job, obtain data in which the job ID of the instructed transmission job and the operation history storing the identification information added until the instruction is accepted are associated with each other, in accordance with acceptance of the instruction for starting the transmission job via the input device,
wherein the operation history associated with the job ID includes a plurality of screen IDs corresponding to the one or more setting screens, and
wherein the obtained data does not include operation history unrelated to the transmission function.

2. The image processing apparatus according to claim 1, wherein the operation history includes time of day information at a time when the key is designated.

3. The image processing apparatus according to claim 1, wherein the identification information of the designated key is a key code for identifying a key provided on the input device.

4. The image processing apparatus according to claim 1, wherein
the input device is a touch panel provided on a displaying device, and
the key is a softkey displayed on the displaying device.

5. The image processing apparatus according to claim 4, wherein the operation history further includes a coordinate position indicating a touched position on the touch panel.

6. The image processing apparatus according to claim 5, wherein the operation history further includes screen identification information of a screen on which the softkey is arranged.

7. The image processing apparatus according to claim 1, wherein the transmission job is a fax job.

8. The image processing apparatus according to claim 1, wherein the setting at least includes setting of a transmission destination.

9. The image processing apparatus according to claim 8, wherein the setting of the transmission destination is performed using an address book.

10. The image processing apparatus according to claim 1, wherein the setting at least includes setting of a reception mode.

11. The image processing apparatus according to claim 1, wherein the setting at least includes setting of resolution.

12. The image processing apparatus according to claim 1, wherein the setting at least includes setting of a density.

13. The image processing apparatus according to claim 1, wherein the setting at least includes setting of a two-sided original.

14. The image processing apparatus according to claim 1, wherein the setting at least includes setting of sharpness.

15. The image processing apparatus according to claim 1, wherein the job ID is generated according to the acceptance of the instruction for starting the transmission job via the input device.

16. The image processing apparatus according to claim 1, wherein, after the designation of the key concerning the setting, the operation history is initialized according to an instruction for using a function different from a function for executing the transmission job, before the instruction for starting the transmission job.

17. A controlling method for an image processing apparatus having a reading device configured to obtain image data by reading an original, a communication interface configured to communicate with an external device, the communication interface being used for executing a transmission job of transmitting the image data obtained by the reading device, and an input device configured to accept an input operation of a user, the controlling method comprising:
outputting one or more setting screens corresponding to a transmission function;
accepting a designation of a key corresponding to at least one of the one or more setting screens via the input device, and adding identification information of the designated key to an operation history in response to the accepting the designation;
accepting an instruction for starting a transmission job;
in accordance with acceptance of the instruction, perform the transmission job and issue a job ID of the transmission job; and
after accepting the instruction for starting a transmission job, obtaining data in which the job ID of the instructed transmission job and the operation history storing the identification information added until the instruction is accepted are associated with each other, in accordance with acceptance of the instruction for starting the transmission job via the input device,
wherein the operation history associated with the job ID includes a plurality of screen IDs corresponding to the one or more setting screens, and
wherein the obtained data does not include operation history unrelated to the transmission function.

18. An image processing apparatus comprising:
an image forming device configured to form an image on a sheet, the image forming device being used for executing an image formation job;
an input device configured to accept an input operation of a user; and
at least one controller configured to function as:
a unit configured output one or more setting screens corresponding to a transmission function;
a unit configured to accept an input of designating a key corresponding to at least one of the one or more setting screens via the input device, and add identification information of the designated key to an operation history in response to the accepting the designation;
a unit configured to accept an instruction for starting an image formation job;

a unit configured to, in accordance with acceptance of the instruction, perform the image formation job and issue a job ID of the image formation job; and a unit configured to, after accepting the instruction for starting an image formation job, obtain data in which the job ID of the instructed image formation job and the operation history storing the identification information added until the instruction is accepted are associated with each other, in accordance with acceptance of an input of instructing a start of the image formation job via the input device, wherein the operation history associated with the job ID includes a plurality of screen IDs corresponding to the one or more setting screens, and wherein the obtained data does not include operation history unrelated to the transmission function.

19. The image processing apparatus according to claim 18, wherein the image formation job is a copy job.

* * * * *